Aug. 4, 1953 — C. J. SCHROEDER — 2,647,282
CANDLEMAKING APPARATUS
Filed June 30, 1950 — 6 Sheets-Sheet 1

INVENTOR.
Carl J. Schroeder
BY Donald E. Payne
ATTORNEY

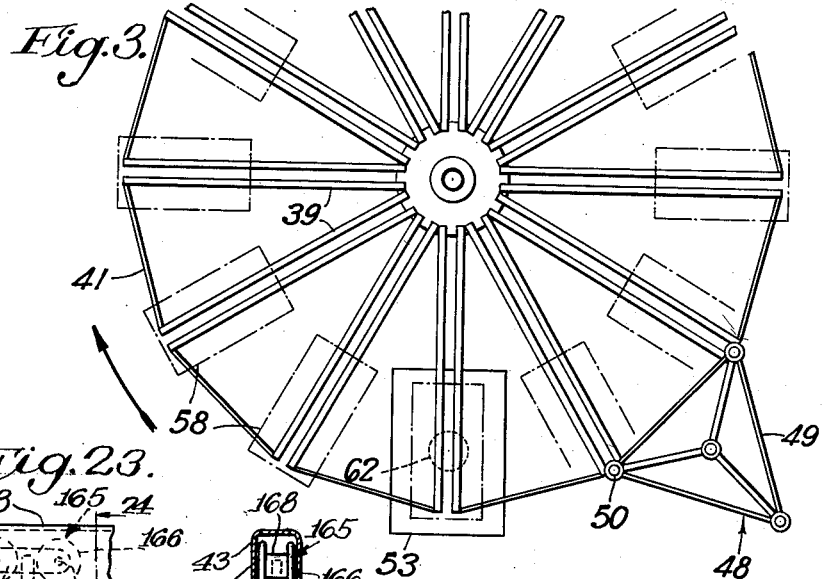
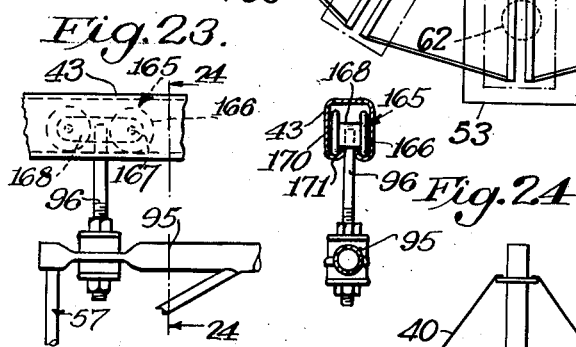
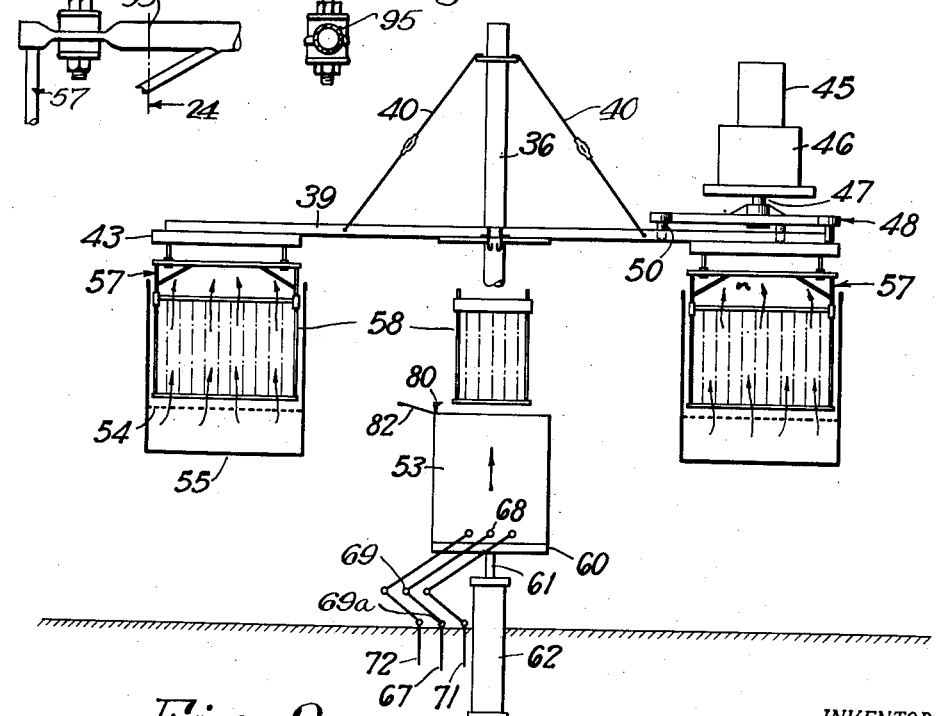

INVENTOR.
Carl J. Schroeder
BY Donald E. Payne
ATTORNEY

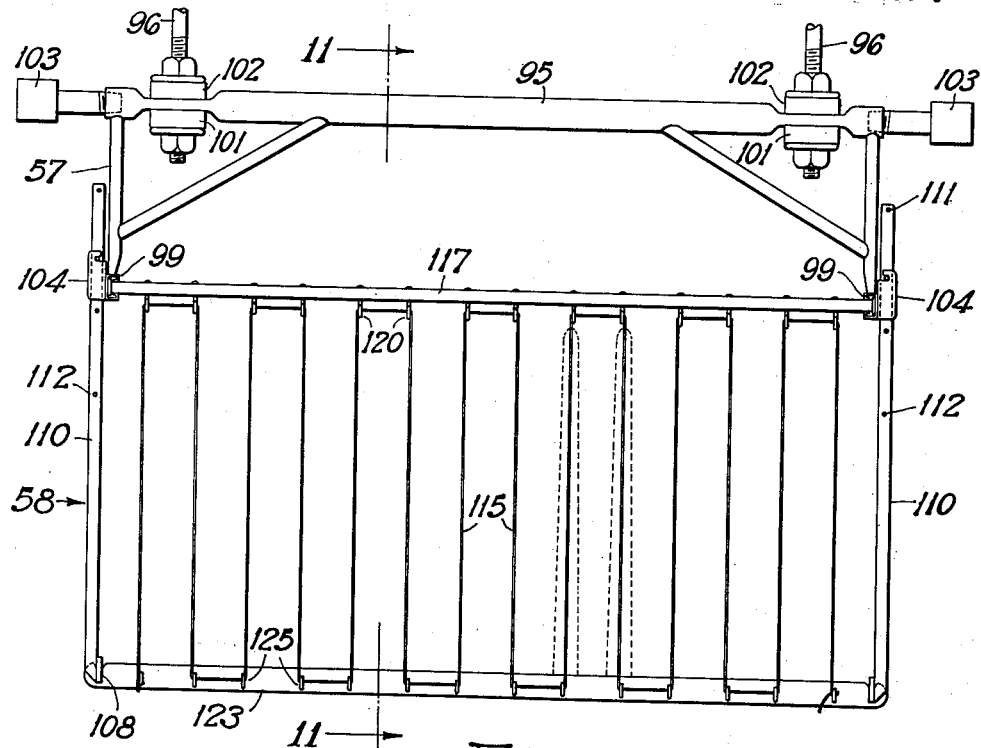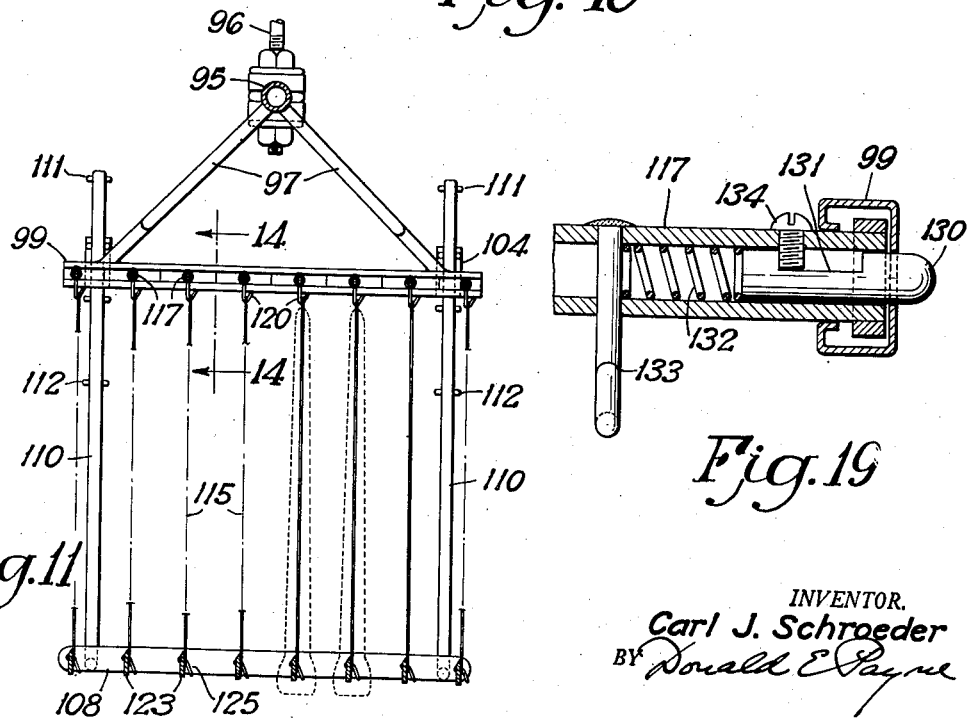

INVENTOR.
Carl J. Schroeder
BY
ATTORNEY

Aug. 4, 1953         C. J. SCHROEDER              2,647,282
                    CANDLEMAKING APPARATUS
Filed June 30, 1950                          6 Sheets-Sheet 6

INVENTOR.
Carl J. Schroeder
BY Donald E. Payne
ATTORNEY

Patented Aug. 4, 1953

2,647,282

UNITED STATES PATENT OFFICE 2,647,282

CANDLEMAKING APPARATUS

Carl J. Schroeder, Hammond, Ind., assignor to Standard Oil Company, Chicago, Ill., a corporation of Indiana Application June 30, 1950, Serial No. 171,419

10 Claims. (Cl. 18—27)

This invention relates to a candle making apparatus and it pertains more particularly to an improved method and means for making dipped candles.

In making dipped candles heretofore, it has been the practice to attach a number of wicks by means of individual springloaded clamps to a rack and lower them manually into a bath of molten wax. The wax for this purpose is usually paraffin that has been modified with stearic acid, dye, etc. The wicks and the adhering wax are withdrawn from the bath and cooled until the wax layer has solidified. In this operation a certain amount of tangling occurs which must be corrected by the handwork of the operator. The dipping operation is repeated until the desired diameter of the candle body is obtained. Normally partial dips are necessary in order to obtain the desired taper of the candle body. The number of layers of wax may vary between 15 and 30 depending on the temperature of the molten wax, the air temperature in the dipping room and the desired diameter of the candle. The candles are usually melted to proper length on a hot plate and the butts are shaped to fit a standard candle holder. Usually the candle is given a finishing dip in a higher melting wax in order to obtain a more pleasing surface appearance and to improve the burning qualities by giving a "non-drip" effect. If desired the candle can be given a surface color different from the core color by a finish dip in wax that has been dyed the desired color.

The main object of my invention is to provide an improved apparatus for dipping candles whereby production costs are reduced to a minimum, speed of production is increased and the uniformity of the product is improved. A further object is to provide a candle dipping apparatus that is essentially automatic in operation.

It is also an object of the invention to provide an improved wick holding rack which holds the candles in perfect alignment while dipping or cooling and eliminates spoilage through distortion and warpage. An additional object is to provide a candle dipping rack that produces dipped candles of accurate lengths. Still another object is to provide a candle dipping rack that simplifies the wick installation and the removal of the candles and permits closer spacing of the candles without spoilage.

Still another specific object of the invention is to provide an improved device for forming a tapered butt on candles.

Other objects of the invention will become apparent from the following detailed description of a specific example thereof:

In order to carry out my invention I have provided an improved wheel which is rotatable on a vertical axis and which carries fixed track sections. The track sections are radially disposed and are adapted to receive the dipping rack supporting carriages. Positioned around the central axis under the track sections is a molten wax bath and a number of cooling stations. The wax bath is positioned on a platform which may be moved vertically. The entire candle dipping operation is carried out automatically by means of control mechanisms. By means of turntables I connect each wheel with a track on which the carriages may be positioned over my butt-forming device, and over other wax baths, and whereby the candle laden carriages may be positioned adjacent packing tables.

A clearer understanding of the invention and the various features thereof will be gained from the following description taken in connection with the accompanying drawings wherein I have illustrated a preferred embodiment thereof.

In the drawings, wherein similar parts are designated by like reference characters throughout the several views, Figure 1 shows in plan view the relation of two wheels to the track system and a portion of the track system leading to the finishing operations.

Figure 2 is an elevation of my improved wheel showing in elevational section the vertically movable wax bath and two of the cooling stations.

Figure 3 is a partial plan view of my wheel showing the construction of the radial arms and the triple crank for rotating the wheel.

Figure 10 is an elevational view of the dipping rack and a partial view of the carriage that supports the rack.

Figure 11 is a vertical section through the dipping rack and carriage taken along the line 11—11 of Figure 10.

Figure 19 is a sectional view of an embodiment for locking in place the outer upper wick holder bars.

Fig. 23 is an enlarged view of one portion of the carriage mounting and a portion of the track section attached to the radial arm.

Fig. 24 is a section taken along the line 24—24 of Fig. 23.

Figure 1:
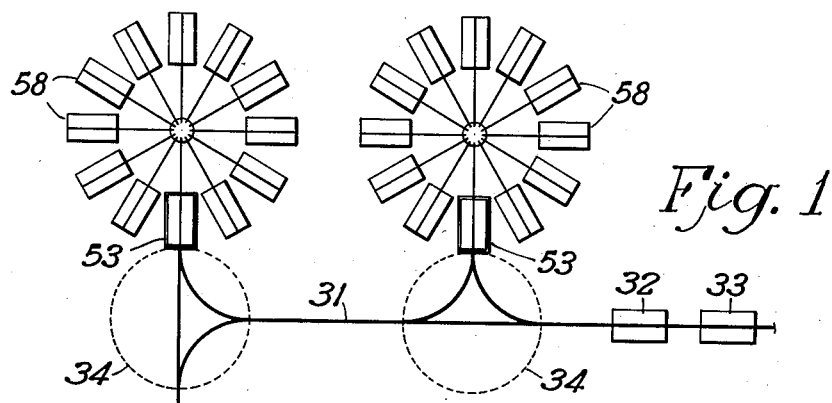
Figure 4:
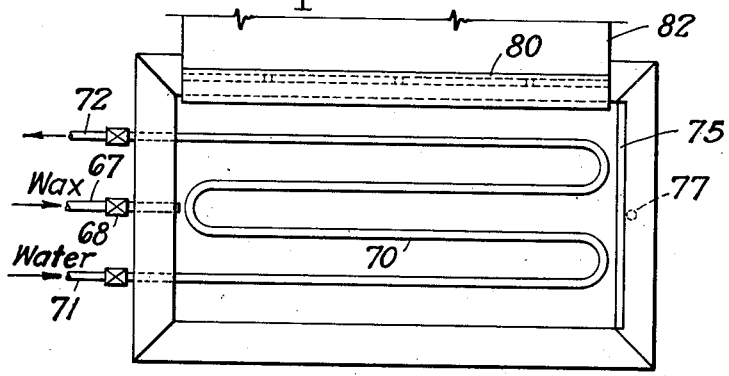
Figure 4 is a plan view of the wax bath.

Referring to Figure 1, the wheels, which are described below, are mounted alongside an endless overhead track 31 which moves past the candle butt former 32 and finishing dip wax baths 33 and packing tables, not shown. Turntables 34 are provided so that the rack supporting carriages may be moved from track 31 to one of the track sections on a wheel, transferred from the wheel back to the endless track or passed directly along the endless track. It is to be understood that suitable aligning means, such as pivoted channel sections, may be used to hold the turntable, wheel, and endless track sections in fixed position with respect to each other when a rack supporting carriage is transferred. Likewise suitable locking means prevent the carriages from rolling from the end of the track sections.

Referring to Figure 2, a vertical shaft 36 is journaled in a bearing on the floor and on the ceiling. Radially extending arms 39 are supported by tie rods 40 and they are held in spaced radial positions by spacer segments 41. The radial arms 39 are of slotted construction but can be solid for a major part of their length with a slot at the outer end only. At the outer end of each radial arm 39 is fixed rigidly a track section 43. Mounted above and near the extremity of the wheel is a hydrauic motor 45 which is connected to a speed reducer 46. The speed reducer 46 is connected by a shaft 47 to a triple crank 48. The triple crank consists of an equilateral triangular frame work connected to the shaft 47 at the geometric center of the triangle; each leg 49 of the triangle is the length of the chord distance between the ends of adjacent radial arms 39. At the tips of the triangle and at the right angles to the plane of the framework are placed cylindrical crank pins 50 which crank pins engage the slots at the end of the radial arms 39. When motor 45 is activated, the triple crank rotates and the crank pins force the wheel to rotate; one crank pin 50 is always in engagement with a slotted radial arm. At the rest point of the triple crank, one radial arm 39 rests directly above molten wax bath 53 and the other arms rest directly above a cooling air outlet grill 54 of cooling air conduit 55.

The track sections 43 support a carriage 57 which carriage supports the candle dipping rack 58. The wax bath 53 rests on a platform 60 which is connected by piston 61 to a hydraulic cylinder 62. When the platform 60 is raised by the piston 61, the wax bath rises and the wax submerges the dipping rack 58 and leaves a layer of wax on the wicks or partially completed candles supported in the rack.

The hydraulic cylinder 62 and the hydraulic motor 45 are interconnected by a common hydraulic system, not shown, wherein solenoid valves cut off the hydraulic fluid from the cylinder 62 when the platform 60 is in the lowest position and open the lines to the motor 45 which rotates the triple crank 48 and causes the wheel to rotate; a solenoid valve is energized when the triple crank has made one-third of a revolution and stops the motor 45; another solenoid changes the hydraulic fluid flow to raise platform 60; at the highest point the solenoid is deenergized and the platform is lowered; whereupon the cycle is repeated. While this interlocked system for rotating the wheel and raising and lowering the wax bath is an important part of my system, all components thereof are conventional and hence require no detailed description. In addition to the automatic operation, the operation of the apparatus by hand control is provided for. For example, it is desirable to be able to rotate the wheel without operating the wax bath platform.

The tank 53 which holds the molten wax bath is encased in insulation 65 which reduces the heat loss from the tank which must be maintained at a temperature of about 135–145° F. The tank itself may be made of any metal not reacted on by the stearic acid normally used as a component of paraffin wax candles; preferably it is made of aluminum. Molten wax enters the tank through a pipe 67 which pipe is equipped with swivel joints 68, 69 and 69a to permit the bath to be raised and lowered. The loss of heat from the tank is compensated for by circulating hot water or steam through a coil 70 immersed in the tank 53. The line 71 into the tank and line 72 out of the tank are equipped with swivel joints similar to the wax line 67. Instead of the swivel jointed lines, flexible hose could be used if it is made of material which will not be affected by the wax or discolor the wax.

Figure 5:
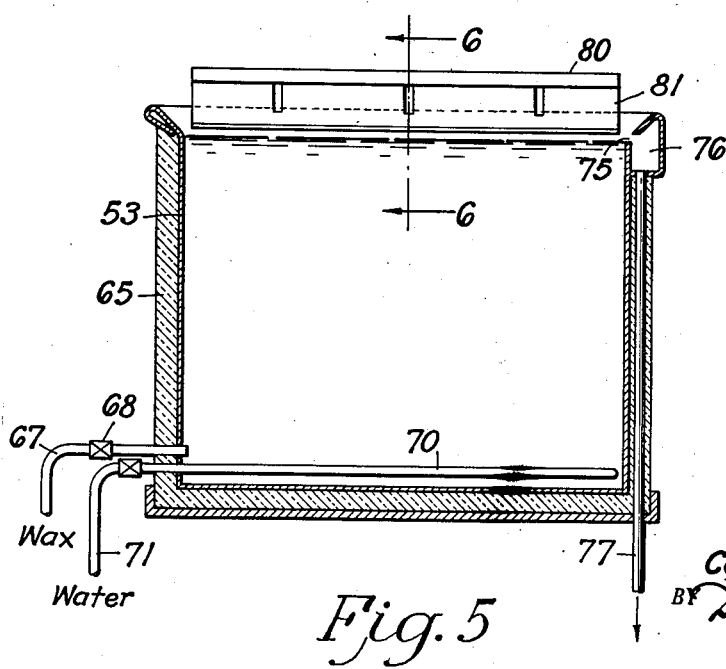
Figure 5 is an elevational section of the wax bath showing the constant level arrangement and overflow system and the knife-edge for removing "tails" from the dipping rack.

In order to permit close control of the candle length, tank 53 is equipped with a constant level control as shown in Figure 5. The preferred type of constant level control is weir 75 placed in one side of the tank. Attached to the tank so as to receive the flow from the weir 75 is a chamber 76 and a telescoping overflow drain pipe 77 which leads the excess wax to a recovery system, not shown. Other types of constant level controls may be used, for example, a float valve set in a separate chamber, but because of its simplicity the weir is preferred.

Figure 6:
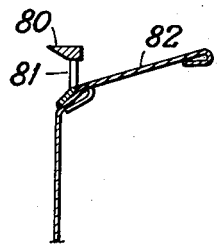
Figure 6 is a vertical section taken along the line 6—6 of Figure 5.

When the wicks are removed from the wax baths, the wax drips and solidifies in icicle-like tails below the dipping rack. It is necessary for accurate control of the candle length to remove these tails; since the wax remains soft for some little time, these tails can be readily cut off by a knife edge or even a taut wire. A preferred type of "tail" remover shown in Figure 6 comprises a bar 80, with one side formed into a knife edge, supported on the lip of tank 52 by slotted flange 81; in this position the tails drop into the wax bath when they are cut off. In order to recover any dripping from the dipping rack after the tails are removed, a wide sloping shelf 82 is attached to edge of the tank so as to extend well beyond the cutting bar 80. The knife bar will pick up heat from the tank and become warm but, if desired, the bar may be made hollow and heated by circulating hot water or steam through it.

Figure 7:
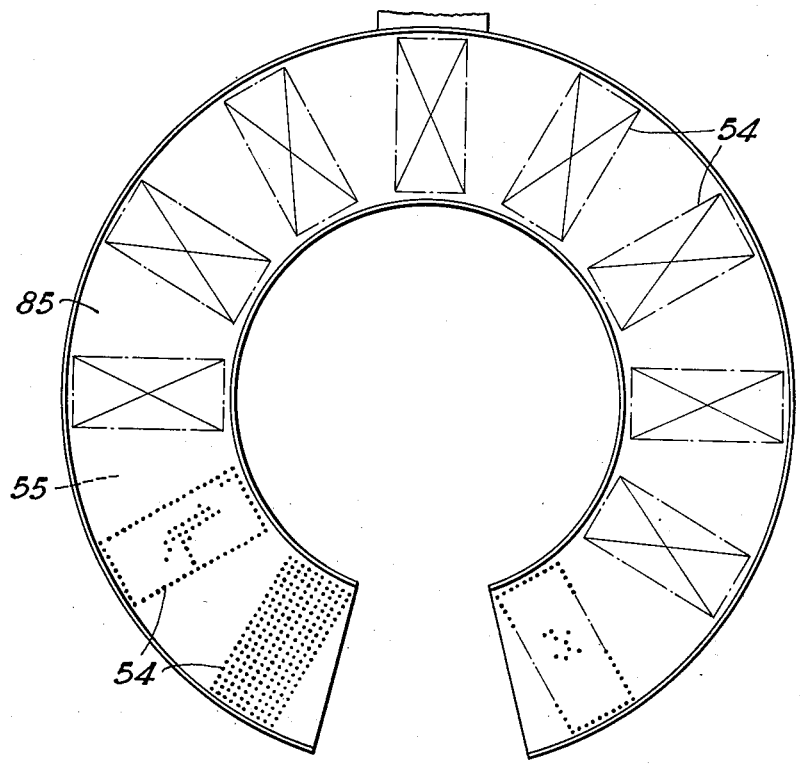
Figure 7 is a plan view of the conduit for conveying air to the cooling stations.
Figure 8:
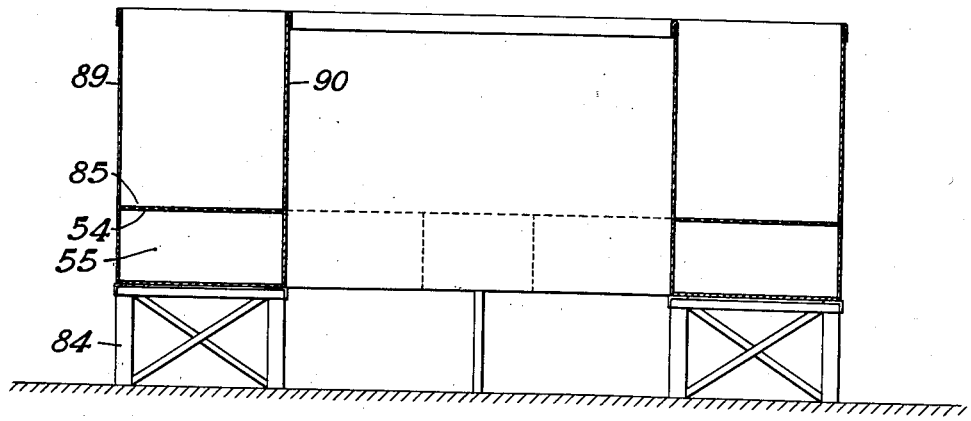
Figure 8 is an elevation of the conduit showing in elevational section the baffle plates extending vertically from the inner and outer sides of the conduit to direct the air up through the racks suspended over the cooling stations.
Figure 9:
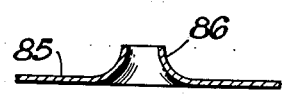
Figure 9 is a vertical section through an individual air outlet.

Normally the wax is permitted to solidify by natural cooling or by blowing ordinary air past the rack. A large improvement in production rate and quality is effected by using cooling air that has been adjusted in temperature to between 60° and 75° F. An annular conduit 55 is supported by structure 84 beneath the outer portion of the radial arms 39, except for the space occupied by the wax bath (see Figures 2, 7 and 8). The upper surface 85 of the conduit (see Figure 8) is placed a short distance below the bottom of the candle dipping rack 58. The upper portion 85 is perforated to form a grill-like structure 54 in groups corresponding to the number of radial arms extending over the conduit. Although a simple hole will operate fairly well, marring of the candle surface by essentially turbulent air is eliminated if the air outlets 86 are given a shape to provide stream-lined flow as shown in Figure 9. Extending vertically upward from the conduit at the inner and outer peripheries are cylindrical walls 89 and 90 which rise nearly up to the radial arms. The walls 89 and 90 prevent diversion of the cooling air to the sides of the wheel, reduce turbulence in the air stream and increase the rate of cooling of the wax.

*Candle dipping rack*

Figure 12:
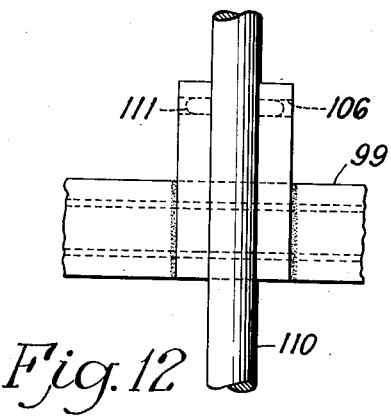
Figures 12 and 13 are views of a portion of the end frame rod and the locking lug.
Figure 13:
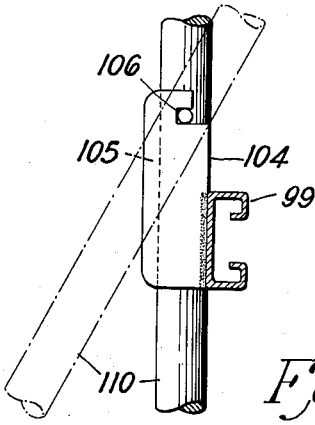
Figure 17:
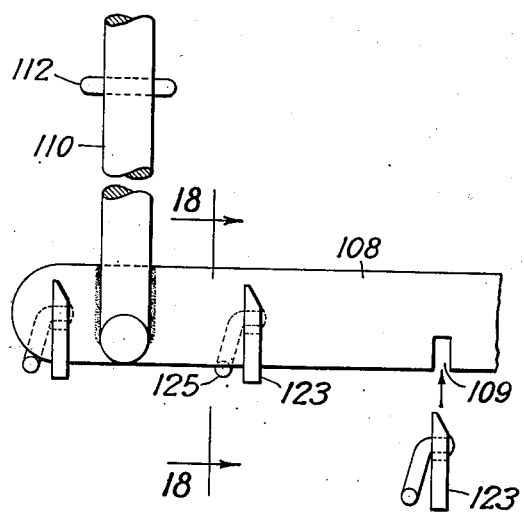
Figure 17 shows a portion of the end frame and of three of the lower wick holder bars.

Carriage 57 is mounted by rollers 165, from track section 43 as shown in Figs. 2, 23 and 24. The carriage itself (see Figures 10 and 11) consists of a supporting rod 95 connected by bolts 96 to rollers 165 (see Figs. 2, 23 and 24) and diagonal legs 97 which are attached to unistrut members 99 which are perpendicular to and placed near the opposite ends of the rod 95. Rollers 165 may be briefly described as a yoke on which two pairs of wheels 166 are pivoted by means of journals 167 and stub shafts 168. The rollers 165 are connected to the carriage 57 by bolts 96. The rollers operate in track section 43 which substantially encloses the wheels by means of downwardly extending flanges 170 and curved bottom flanges 171 on which the wheels 166 are adapted to run. Bolts 96 are attached to rod 95 through vibration dampening members 101 and 102 which are preferably made of rubber. Other methods of hanging the rod 95 so as to prevent the transfer of vibration from the track sections to the soft wax candles in the rack may be used. Even slight vibration of the rack causes undesirable ripples to appear in the surface of the candles. Attached to the ends of rod 95 are bumpers 103 which may be simply rubber cushions or spring loaded shock absorbers. The horizontal members 99, preferably of unistrut construction, are in the same horizontal plane;

their length and distance apart is determined by the size of the wax bath used for the dipping operation. The bars 99 each support, in this embodiment, two lugs 104 (see Figures 12 and 13) which extend above the bars. Lugs 104 have a vertical slot 105 in the outer surface of the lug and a horizontal slot 106 near the upper surface of the lug. The end frames of the dipping rack consist of a flat bar 108 that has recesses 109 (see Figure 17) cut into the lower edge thereof. Extending vertically from near the ends of the lower bar are two rods of about the same diameter as the width of lug slot 105; near the upper end of rod 110 a pin 111 is inserted; pin 111 fits into lug slot 106. The upper lip of slot 106 is shortened somewhat so that the end frame can be attached to the bar 99 by tilting rods 110 at an angle to the vertical, inserting pin 111 into slot 106 and lowering the end-frame so that rods 110 enter slot 105 and hang vertically. This method of hanging the end frames results in a positive locking action since the end frames cannot be removed until they are tilted at a sufficient angle from the vertical. Other means of attaching the end-frames can be readily devised but this method is simple and virtually foolproof.

The end frames need not be made in this particular manner. A T construction with only one vertical bar may be used. However it is preferable to use the illustrated form because wax builds up on the rods and the larger size necessary for a single vertical member would result in excessive wax buildup; this disability can be overcome by spacing the end frame farther from the adjacent candle wicks but this can be done only by decreasing the number of candles on each rack. The horizontal bar 108 should be as thin as structural requirements permit in order to prevent buildup of wax on the top edge of the bar; forming a tapered edge on the upper part of this bar will also decrease wax buildup. The length of rods 110 is determined by the length of the candle being produced; however, in order to gain flexibility additional cross pins 112 can be placed into the rod at points equal to various candle lengths such as 10, 12, 16 and 18 inches.

Figure 16:
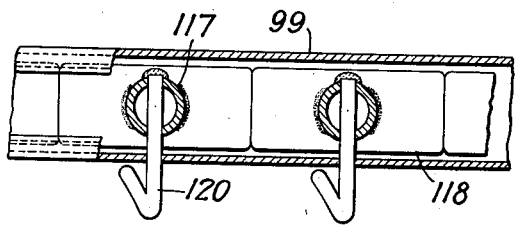
Figure 16 is a partial sectional view of two upper wick holder bars as taken along the line 16—16 of Figure 14.
Figure 14:
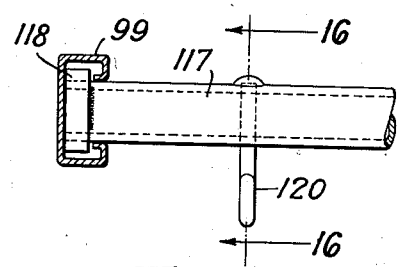
Figure 14 is a view of a portion of the upper wick holder as taken along the line 14—14 of Figure 11.
Figure 15:
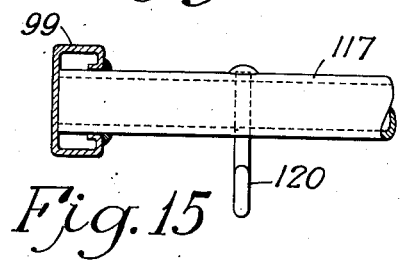
Figure 15 shows an alternate form of the upper wick holder bar.

The candle wicks 115 are held in the dipping rack by means of upper and lower wick holding bars. Upper wick holding bars 117 are supported by members 99. These bars 117 may be rigidly fastened to member 99 as is shown in Figure 15 or they may be removable as shown in Figures 14 and 16. The removable upper wick holders have attached to their ends a metal strip 118 dimensioned to fit slidably into the unistrut member 99 (Figure 14). Other methods of supporting these bars 117 on member 99 are readily apparent. Metal strips 118 are of such length that adjacent bars 117 are held at the proper spacing for the desired candle diameter.

Figure 18:
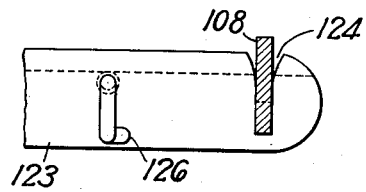
Figure 18 is a sectional view of the end-frame and a portion of a lower wick holder bar as taken along the line 18—18 of Figure 17.

Spaced at proper distances along the length of wickholder bar 117 are the actual wick supporting members 120 which I designate as "wedgehooks." The wedgehooks are made from smooth surfaced ductile metal which can be bent into such a form that a wedge shaped space is formed between the shank portion and the curved nib portion of the wick supporting member 120. The lower wick holder bar 123 is made from a thin flat strip of metal with a knife edged upper portion to decrease wax buildup; near the ends of member 123 recesses 124 are cut to receive the horizontal bar 108 of the end-frame (Figure 18). Spaced along the length of the lower wick holder bar 123 are wedgehooks 125 which are so arranged in relation to an upper wedgehook 120 that a wick stretched between vertically adjacent wedgehooks will be perpendicular to the wick holding bars. For convenience in holding the wick when it is strung from the end wedgehook on one lower bar to the adjacent wedgehook on an adjacent lower bar, a small nib 126 (Figure 18) may be placed on the tip of the end lower wedgehooks. The wedge shaped space in the wedgehooks must be at such an angle that the wick will be firmly held from slipping through the wedgehooks and yet must be held lightly enough that a slight upward force on the wick will release the wick from the grasp of the hook. The wedge portion must be smooth surfaced or the wick will not release readily. While any corrosion resistant metal that can be bent or shaped to the proper form may be used, I have found Monel metal to be the best for this purpose. I prefer to use an even number of wedgehooks on each bar in order to increase the ease of wicking the rack and removing the completed candles.

When the upper wick holder bars are removable and are designed to slip into a unistrut bar, it is necessary to provide some means of locking the end bars into place. A convenient way of doing this is shown in Figure 19. A hole is drilled at the proper place in member 99. A retractable stub 130 is mounted in a hole made in the end of upper wick holder 117. A slot 131 is machined into stud 130; a spring 132 is inserted into the hollow end of member 117; screw 134 is fastened to member 119 so that it extends into slot 131 and prevents the stud 130 popping out of the hole. The rounded surface of stud 130 allows the wick holder bar to be put into place by light pressure on the bar and the spring forces the stud through the hole in unistrut 99. To remove the end upper holder the stud 130 is forced into the hole by thumb pressure and the wick holder bar is then removed. While the above is preferred for my purposes, other methods may readily be devised to lock the removable end upper wick holder bars in place.

The candle dipping rack is exposed to corrosion by the stearic acid present in most candle compositions, so corrosion resistant materials should be used in its construction. Furthermore, the parts should be as small as strength requirements permit in order to reduce wax buildup. I prefer to make the wedgehooks out of Monel metal and the other parts of stainless steel.

*Candle butt tapering*

Figure 20:
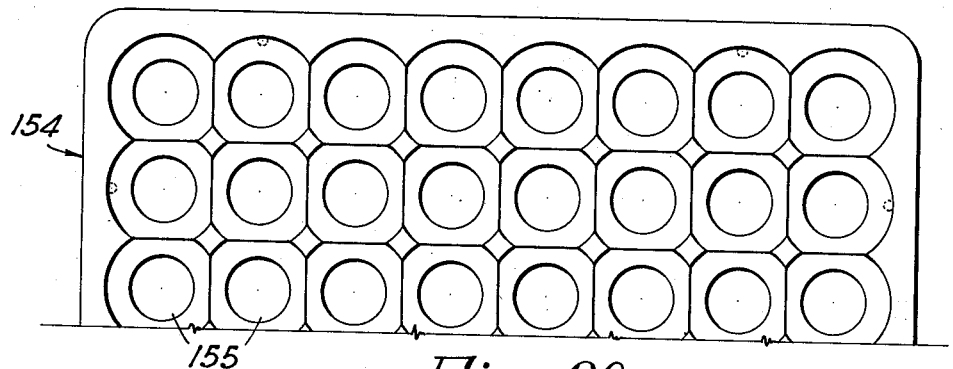
Figure 20 is a plan view of a portion of the guide plate of the candle butt forming machine.
Figure 21:
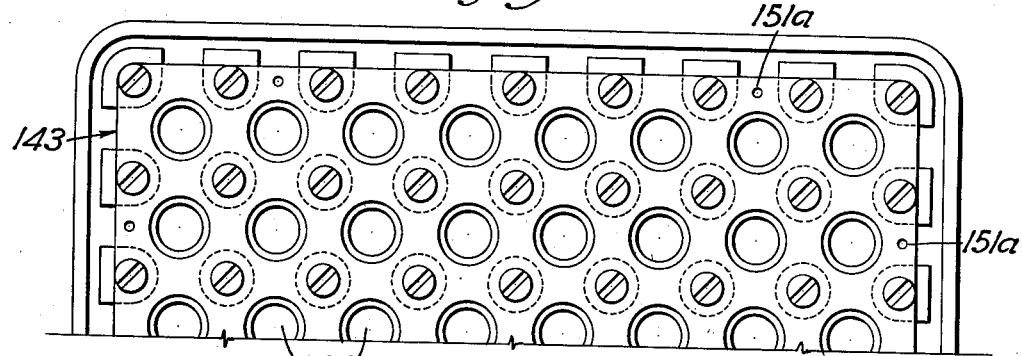
Figure 21 is a plan view of a portion of the mold plate of the butt forming machine.
Figure 22:
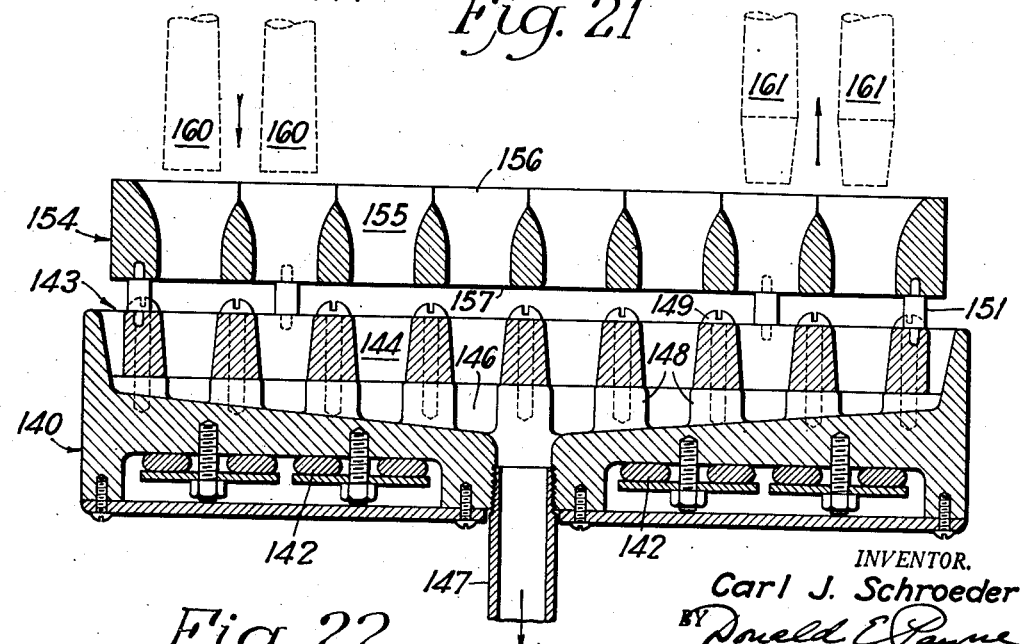
Figure 22 is an elevational view through a section of the butt forming machine showing the guide plate, the mold plate, the carrier, the heating elements and the molten wax drain.

After the dipping process is complete, the dipping rack is transferred to endless track 31. The lower wick holders and end frames are removed by cutting candles and wicks adjacent the lower wick holder and the candles hang supported by the upper wick holders only. The carriage is moved into position over the butt tapering machine 32 where the end is shaped to fit a standard candle holder. A preferred embodiment of my improved butt tapering machine comprises a carrier 140 (see Figures 20 and 22) which is made of metal that has a high heat conductivity, and is not corroded by stearic acid, such as, aluminum. Carrier 140 is provided with thermostatically controlled heating means; the preferred heating means, electrical resistance elements 142, are illustrated. Although steam or hot water may be used for heating purposes electrical heating provides more accurate control of temperature, permits wide and rapid variation in the heat input and permits a simpler construction of the carrier.

Mold plate 143 which is made of metal, such as aluminum, is provided with holes 144 which are in the form of a frustum of a cone, i. e., the shape of the socket of a candle holder. The mold holes 144 are bottomless (open bottomed) so that no obstruction occurs to the rapid removal of the molten wax as the candle butt is lowered into the hot mold hole as happens when a perforated bottom exists in the mold hole. The upper surface of the heating element containing carrier 140 is provided with serrations forming interconnected channels 146 which carry the molten wax away to the drain 147. The raised portions 148 of the serrations support the mold plate 143. The supporting ridges 148 and the mold plate 143 are held together tightly by screws 149 in order to insure good heat transfer from the hot carrier 140 to the mold plate 143. Spacing members 151, preferably made of low heat conductivity material, support above the mold plate 143 a guide plate 154 which is made of material having a low coefficient of heat transfer. Particularly good results were obtained when the guide plate was made from a Phillipine mahogany plywood sheet 1½ inches thick that had been saturated with molten paraffin wax. However, the guide plate may be made of any material that is a poor heat conductor and that can be molded or worked readily, for example, Bakelite or asbestos cement.

The guide plate 154 is provided with holes 155 which are made in an inverted bell shape. These holes 155 equal in number the mold holes 144 and are placed directly above and on the same vertical axis as the corresponding mold holes. The number of mold holes and guide holes normally will be the same as the maximum number of candles carried by the dipping rack. The guide holes 155 are shaped to curve gradually from a diameter, at the mouth of the bell 156, that is substantially greater than the butt end of the candle to a diameter, at the throat of the hole 157 that is just perceptibly larger than the butt end of the candle. The thickness of the guide plate is such that the candle is supported vertically in the guide hole for a substantial portion of the thickness of the guide plate; this supporting height must be great enough that no marring of the surface of the candle occurs when the candle touches a portion of the guide hole during the butt forming operation. The mouth 156 of the guide hole must be large enough to permit the entrance of the candle even when the candle is swinging somewhat from the vibration of the carriage as it comes to rest above the butt tapering machine; about 1½ times the butt diameter is a satisfactory mouth diameter. The guide plate must be thick enough to provide a slope of the guide hole that will permit the edge of the butt to pass into the throat quickly and without deformation; the guide plate thickness should be between 1½ and 2½ times the butt diameter for good results.

The advantages of this type of guide plate are that the candle is not deformed or marred by the guide plate because this is relatively cool as a result of its low heat conductivity; the smooth surface of the guide holes and steep angle of the sides of the hole directs the candle end to the mold hole without marring the surface of the candle; the thick plate permits the candle to be supported vertically in the mold hole and produces a uniformly tapered end. These advantages increase the production rate and decrease the number of candles that must be rejected because of defects.

The above illustrates a preferred embodiment of my invention and does not set out all the possible variations thereon that can be made without departing from the spirit of my invention. I have shown the use of one wax bath and 11 cooling stations; however, the number of cooling stations may be varied to suit the particular operating conditions. The number of wax baths may be increased by increasing the size of the wheel. When a high melt wax is being used, the amount of cooling needed is less so that the cooling stations may be decreased and a second or third bath introduced into the wheel shown above. Under some conditions of operation the use of cooling air may be dispensed with and natural convection alone relied upon to cool the candles.

*Operation*

The candle making operation begins with the assembly of the candle dipping rack 58. The operator places on the endless track system 34 a dipping rack carriage 57 and inserts into the unistruts 99 the upper wick holders 117; the two end wick holders 117 are provided with the locking means shown in Figure 19. Next the operator attaches the end-frames by inserting the cross pin 111 of the rods 110 into the slots 106 of lugs 104, and allows the end-frames to hang vertically—thus they are securely locked to the unistrut 99. The wicking operation is then carried out by looping the wick cord about one of the end wedgehooks 120 of an end upper wick holder 117; a lower wick holder 123 is fitted into slot 109 in the horizontal bar 108 of the end frames and the wick 115 is brought down, pulled taut and wedged into the corresponding end wedgehook 126 of the lower wick holder. The wick is passed horizontally to the adjacent lower wedgehook, wedged into place and then taken vertically to the corresponding upper wedgehook. This procedure is carried on to the last wedgehooks on the bars, then another lower wick holder is put into position and wicked and the operation repeated until all the lower holders are in place and the wick is fastened by a loop around the last wedgehook. Each wick is held taut by its wedgehooks independently of the other wicks in the rack. Thus the lower wick holders are held securely by the force of the taut wicks extending between the bars. This arrangement permits easy and rapid assembly of the dipping rack and allows closer spacing of the candles because there is no swinging of the candles during the dipping steps.

When enough assembled racks are ready, the rack supporting carriages are transferred to the track sections 43 on the radial arms 39 by means of the turntable 34. During this loading step, the automatic controls are cut out and the wheel is rotated under manual control.

The wax tank 53 is filled with a molten candle composition through inlet 67; usually the composition comprises a major proportion of 130–132° F. M. P. paraffin wax and a minor proportion of stearic acid. If a colored core candle is desired, the appropriate dye is added to the wax. The wax bath is maintained at a temperature selected from the range of 140–145° F.; the wax temperature is maintained by means of a heating coil, immersed in the tank, through which water is circulated at a temperature within 1–2° F. of the desired bath temperature. Molten wax is passed into the bath continuously and the level of the bath is maintained constant by weir 75.

When the wheel is loaded with dipping racks, the wax bath ready and cooling air issuing from the conduit 55, the automatic controls are actuated and the candle dipping process begins. The hydraulic cylinder 62 raises the platform 60 which elevates the wax bath until the dipping rack is submerged to a point just below the upper wedge hooks 120 (the distance between the bottom of the upper wedgehook and the top edge of the lower wick holder bar determines the candle length) at which time the platform stops and immediately is reversed and lowered to its rest position. While the wick was in the wax bath a layer of wax was coated thereon. In normal operations the time of raising the platform will be set at between 2–3 seconds with an equal time for lowering. The weir opening 75 is large enough so that the wax that is displaced by the dipping rack will overflow into the chamber 76 and be carried away by the drain pipe 77. When the platform 60 has reached its low position, the solenoid controls actuate the hydraulic motor 45 which causes the triple crank 48 to revolve and the crank pins 50 to force the wheel to turn clockwise just far enough to swing the next adjacent dipping rack over the wax bath and place the freshly dipped wicks over the first cooling station. This turning movement takes about 2.5 seconds.

I have found that uniformity in shape of candles can be best obtained by keeping candles rigid in the dipping rack, bringing the wax bath to the wicks and controlling the cooling rate of each wax layer. If the candles are not rigidly held they swing and bump each other, often freezing with two or three stuck together in clumps. In the usual method of dipping by lowering the candle rack into the wax bath, the jarring of the rack caused the wax layer to flow toward the bottom of the wick resulting in misshapen candles. Often partial dips were used to give the candle the desired taper shape. The candle length varied in manual dipping because each operator dipped more or less haphazardly; some dipped the wick clamps into the wax making the candle too thick at the top; others did not dip far enough. My rack and my procedure of bringing the bath to the rack insures dipping each and every layer of wax to the precise length desired and eliminates the excess downflow of the wax on the wick. This permits the production of candles of the proper shape without the use of partial dips.

When the dipping rack emerges from the wax bath, all parts below the upper wedgehooks are coated with molten wax. This wax will drip below the rack and solidify in long icicle-like tails hanging from the lower wick holders and end frame; if not removed, this would interfere with the dipping on the subsequent dips. I eliminate this problem by removing the wax tails from the rack as the rack is moved away from the wax bath. A knife edge 80 is mounted on the tank and is set to a height just below the bottom of the dipping rack to remove the soft wax tails. Most of the wax drops into the tank but some drops off beyond the knife; in order to keep this wax off the apparatus and floor, I have provided a shelf-like extension 82 to the tank which acts as a drip pan and returns the drippings to the wax tank 53. While I show a solid bar, a bar with provisions for heating with steam, water or electricity may be used; in most instances a taut wire will remove the wax tails.

I have found that the optimum production of satisfactory quality candles using normal wax composition requires forced circulation of air around the cooling candles at a temperature between 60–75° F. I prefer to artificially cool, if necessary, air to this temperature, by means not shown, pass the air into conduit 55 from which conduit the air emerges through grill 54 and is directed by baffles 89 and 90 to flow up through the candles supported in the dipping rack. The rate of air flow should be held below the point where turbulence causes defects to appear in the candle surface.

The dipping cycle is repeated until the layers of wax have been built up to the desired diameter. The number of layers needed will vary with wax composition and operating conditions but 15–30 layers, usually 18–24, will be enough. My preferred embodiment will produce 12 racks of candles in about 40 minutes.

After all the candles have been dipped to the proper diameter, the automatic controls are cut off and the loaded dipping racks are transferred to the endless track system 31 and the wheel loaded with empty racks. It is possible if desired to unload and load in sequence each track section 43 by the use of two turntables; the saving in time by so doing is so slight that I prefer to unload completely the candle filled racks before loading with empty (wicked) rack.

The operator frees the candles in the rack by supporting each lower wick holder 123 with one hand while he draws a thin knife along the top of wick holder 123 cutting through the plastic wax and the wicks. If the cutting is performed carefully each candle will have a smooth flat bottom. Cutting the wicks frees the wick holder 123; each row of candles is similarly cut free of the lower wick holder. The candles hang by their wicks which are securely held by the upper wedge hooks 120. As can be seen in Figure 10 the candles hang in pairs joined by a common length of wick at the tops of the candles. The operator then removes the end-frames and starts the carriage with its dangling candles to the finishing operations.

The carriage passes along the endless track system until it reaches a position directly over the butt tapering machine 32. The butt tapering machine is mounted on a vertically movable platform, not shown, which may be adjustably raised to any elevation dictated by the candle length being processed. When the carriage is directed over the tapering machine, the operator elevates the platform; as the platform mounts upward the guide holes 155 direct the candle butts 160 into the tapering molds 144 and hold the candle vertically until the butt taper has been completed. The molten wax passes through the bottom of the mold hole 144 to the drain 147 and is recovered elsewhere. When the butt has been tapered to standard size, the machine is lowered and the shaped candles 161 are ready for the finishing dip.

In order to improve the surface appearance and/or give a color different from the core color, the butt tapered candles are moved over a finishing dip bath 33 and dipped therein. After the finishing dip the candles are cooled and passed along the track 31 to the packing tables. Here the joined pairs of candles are removed from the upper wedgehooks 120 and the common wick cut in two to form the exposed end of the wick of the finished candle.

While I have described a preferred embodiment of my invention, many modifications and alternative arrangements and procedures will be apparent from the above description to those skilled in the art.

I claim:

1. In a candle making machine the combination of a wheel rotatable on a vertical axis, radially extending arms on said wheel, holders for supporting the tops and bottoms of wicks and partly-formed candles positioned below and supported by said radial arms, a wax bath, means for intermittently rotating the wheel to carry said holders into position over the wax bath, means for reciprocably moving the wax bath toward and from the holders so as to immerse the wicks and partly-formed candles thereon in the wax bath during each stop period of the wheel and means for removing during the period of movement of the wheel "wax tails" from the wicks and partly-formed candles.

2. In the combination of claim 1, means for contacting with a gaseous cooling fluid the wicks and partly-formed candles after these have been moved from a position over a wax bath.

3. In a candle making machine, the combination of a wheel rotatable on a vertical axis, radially extending arms on said wheel, holders positioned below and supported by said arms for supporting both tops and bottoms of wicks and partly-formed candles, a wax bath, automatically controllable mechanism for intermittently rotating the wheel to carry said holders into position over the wax bath and for reciprocably moving during each stop period of the wheel, the wax bath toward and from the wicks and partly-formed candles and immersing these in the bath, knife-like means for removing "tails" from the holders during the period of movement of the holders away from the position over the wax baths, and means for cooling the wicks and partly-formed candles by contact with a gaseous cooling fluid which cooling means is operative only on those holders not positioned over the wax bath.

4. In the combination of claim 3 means for introducing molten wax to the wax bath, means for maintaining a constant level of wax therein, and means for maintaining the wax bath at a predetermined temperature.

5. In the combination of claim 3, baffle members which direct the gaseous cooling fluid parallel to the wicks and partly-formed candles.

6. The combination of claim 3 wherein the cooling means comprises a conduit positioned below the holders except for the space occupied by the wax bath, said conduit is provided with perforations which direct the cooling gaseous fluid toward the wicks and partly-formed candles and baffle members extending vertically from said conduit and enclosing the space traversed by the holders during the rotation of the wheel.

7. In a candle dipping rack, the combination of a frame, supporting members carried by said frame in spaced relation horizontally, a plurality of upper elongated members carried by said supporting members, a plurality of upper wedge-hooks carried by said upper elongated members, means for maintaining said upper elongated members in spaced relationship horizontally, a plurality of lower elongated members, a plurality of lower wedge-hooks carried by, and positioned below the upper plane of, said lower elongated members in spaced relationship corresponding to the spacing of said upper wedge-hooks, and adjustable means for positioning said lower elongated members a predetermnied distance corresponding to the desired candle length beneath said upper elongated members so that said upper and said lower wedge-hooks are in vertical alignment such that a wick passed between corresponding upper and lower wedge-hooks is substandtially perpendicular to said elongated members, whereby a single continuous wick-cord may be readily passed between corresponding upper and lower wedge-hooks to obtain a plurality of substantially vertical wicks in said rack in order that a plurality of individual, separate candles can be produced by the dip method and whereby the individual, separate candles may be readily freed from said lower wedge-hooks by passing a knife along the upper plane of said lower elongated members and cutting the wicks at that point.

8. In the combination of claim 7, means for suspending said frame from a support.

9. In the combination of claim 7, wedge-hooks which are in the form of a hook with the nib bent on a convex curve to form a wedge shaped opening between the nib and the shank whereby a candle wick may be securely held by a wedging action.

10. In a rack which is adapted to the production of candles by the dip method, the combination of a frame, means for suspending said frame from an overhead support, parallel supporting members carried by said frame in spaced horizontal relationship, a plurality of upper rods carried by said supporting members, a plurality of spaced upper wedge-hooks carried by said upper rods, means for maintaining said upper rods in spaced horizontal relationship in a plane substantially perpendicular to the plane of said supporting members, vertical rod-like end-members adjustably mounted with respect to said supporting members, which end-members are provided with thin cross-members positioned a predetermined distance below said supporting members, which cross-members are provided with notches in the lower plane thereof, a plurality of lower thin, narrow bars, a plurality of lower wedge-hooks carried by, and positioned below the upper plane of, said lower bars in spaced relationship corresponding to the spacing of said upper wedge-hooks, which lower bars are positioned in said notches of said cross-members to obtain a vertical alignment of said upper and lower wedge-hooks between said end-members and whereby said lower members are positioned in spaced horizontal relationship at a vertical distance beneath said upper bars such that a candle of the desired length can be produced and whereby a single continuous wick-cord may be readily passed between corresponding upper and lower wedge-hooks to obtain a plurality of substantially vertical wicks in said rack in order that a plurality of individual, separate candles can be produced by the dip method and whereby the individual, separate candles may be readily freed from said lower wedge-hooks by passing a knife along the upper plane of said lower elongated members and cutting the wicks at that point.

CARL J. SCHROEDER.

References Cited in the file of this patent

UNITED STATES PATENTS

| Number | Name | Date |
|---|---|---|
| 9,696 | Kendall | May 3, 1853 |
| 125,632 | Traux | Apr. 9, 1872 |
| 705,289 | Peck | July 22, 1902 |
| 1,168,433 | Seiter | Jan. 18, 1916 |
| 2,007,773 | Schroeder | July 9, 1935 |
| 2,241,176 | Boecler et al. | May 6, 1941 |
| 2,241,177 | Boecler et al. | May 6, 1941 |
| 2,478,202 | Moore | Aug. 9, 1949 |
| 2,486,469 | French | Nov. 1, 1949 |

FOREIGN PATENTS

| Number | Country | Date |
|---|---|---|
| 361,878 | Germany | Oct. 20, 1922 |